Dec. 27, 1927.
A. J. KELLY
1,654,465
CONVERTIBLE WAGON AND SLED
Filed Aug. 27, 1926
2 Sheets-Sheet 1
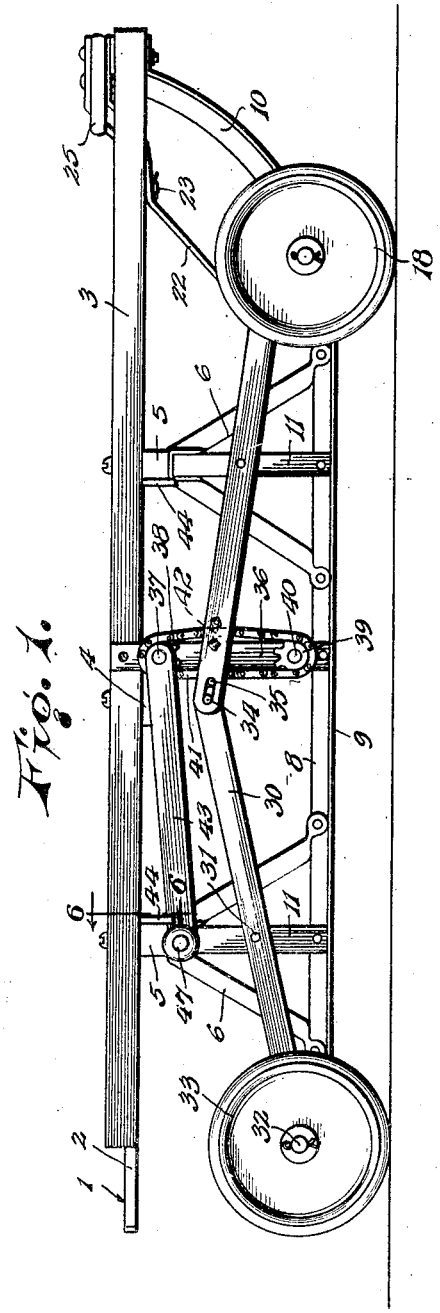
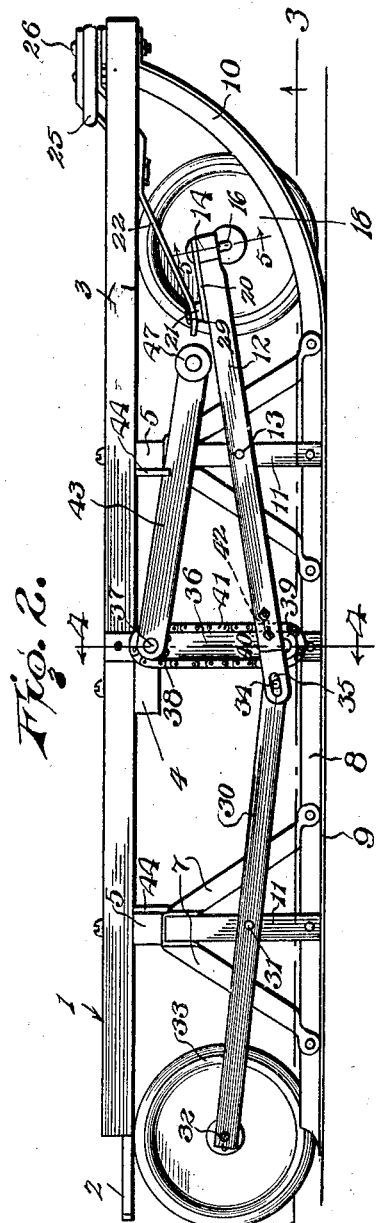
Inventor
A. J. Kelly
By
Lacey & Lacey, Attorneys

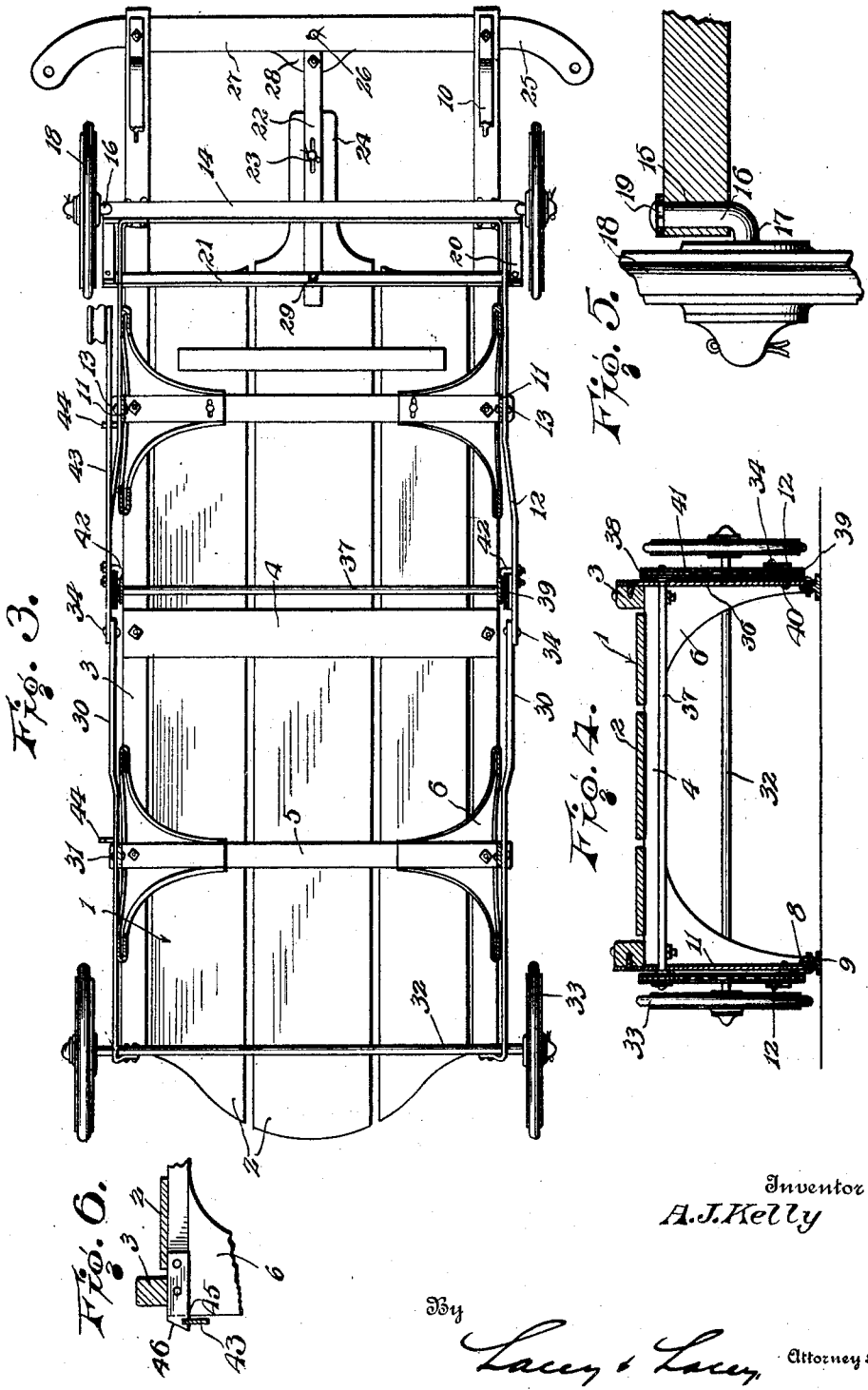

Patented Dec. 27, 1927.

1,654,465

UNITED STATES PATENT OFFICE.

ANDREW J. KELLY, OF BALTIMORE, MARYLAND.

CONVERTIBLE WAGON AND SLED.

Application filed August 27, 1926. Serial No. 131,959.

This invention relates to improvements in convertible sleds and coaster wagons and has as one of its objects to provide a device of this class so constructed that the front and rear axles thereof may be readily and quickly adjusted to assume either a lowered or an elevated position, as desired, so that in the first position of adjustment the device will be employed as a coaster wagon and, in the second position of adjustment, as a sled.

Another object of the invention is to so construct the adjusting means that the same will be securely and firmly locked in either of its positions of adjustment and not be liable to be accidentally released.

Another object of the invention is to so construct the said means that, if desired, it may be actuated while a child is riding on the platform of the device, so as to effect upward movement of the axles in the event the child should find it necessary to suddenly arrest the motion of the device, thus permitting the runners to contact the pavement surface and serve as brakes.

Another object of the invention is to provide pairs of rocking lever arms for supporting the front and rear axles and a novel means for simultaneously rocking these arms so as to effect simultaneous adjustment of the two axles, this being accomplished through the rearward or forward swinging movement of a hand lever conveniently arranged with respect to the platform of the device.

In the accompanying drawings:

Figure 1 is a side elevation of the device embodying the invention, arranged for use as a coaster wagon.

Figure 2 is a similar view illustrating the same arranged for use as a sled, the wheels at the near side of the device being removed in this figure to better illustrate the construction.

Figure 3 is a bottom plan view of the device, parts being shown in section.

Figure 4 is a vertical transverse sectional view taken substantially on the line 4—4 of Figure 2, looking in the direction indicated by the arrows.

Figure 5 is a detail vertical sectional view taken substantially on the line 5—5 of Figure 2, looking in the direction indicated by the arrows.

Figure 6 is a detail vertical sectional view taken substantially on the line 6—6 of Figure 1, looking in the direction indicated by the arrows.

The device embodies a platform which is indicated in general by the numeral 1 and which comprises longitudinal boards 2, side rails 3, and cross pieces 4 and 5 upon which the said boards 2 are supported and secured. The numeral 6 indicates bolsters which are preferably of pressed sheet metal and secured to the under sides of the cross pieces 5 and provided each with a pair of downwardly diverging legs 7 which, at their lower ends, are secured to the upstanding flanges 8 of runners 9, the runners at their forward ends being upwardly curved as at 10 and secured to the under sides of the side rails 3. The bolsters 6 further include vertical members 11 which are located between the said legs 7 and which are secured at their lower ends to the flanges 8 of the runners 9.

Bars 12 are pivotally mounted intermediate their ends, as at 13, upon the uprights 11 of the forward bolsters and a cross piece 14 extends between the forward ends of the said bars 12 and is provided at its ends with openings 15 in which are mounted, for turning movement, the upstanding arms 16 of wheel spindles 17 upon which the front wheels 18 of the device are rotatably mounted. The arms 16 of the spindles are squared at their upper ends, as indicated by the numeral 19, and arms 20 are fitted to the squared upper ends of said arms 16, and are connected by a radius bar 21, the arms extending rearwardly in parallel relation and the radius bar 21 being pivotally connected at its ends to the rear ends of the said arms 20, whereby lateral movement of the radius bar will effect simultaneous and corresponding swinging of the arms 20 to effect rotation of the spindle arms 16 in their respective bearing openings 15 and a corresponding turning of the front wheels to provide for steering of the device. Such movement of the radius bar is effected by a rocking lever 22 pivotally mounted between its ends, as at 23, upon the under side of a forward extension 24 of the middle platform board 2 of the device. The numeral 25 indicates a handle bar which is pivotally mounted by a bolt 26, intermediate its ends, upon a cross piece 27 which extends between the forward ends of the side rails 3 of the platform 1, and the said handle bar is provided with a short rearward extension 28, to which the forward end of the lever 22 is pivotally connected, the rear end of the lever being pivoted, as at 29, to the intermediate portion of the radius bar 21. At this point it will be understood that the handle bar 25 may be rocked about its pivot to effect adjustment of the front wheels in steering the device.

Rocking bars 30 corresponding to the bars 12 are pivotally mounted intermediate their ends, as at 31, upon the rear uprights 11 and an axle 32 is journaled at its ends in the rear ends of the said bars 30 and has wheels 33 mounted rotatably thereon. Studs 34 are fixed at the forward ends of the bars 30 and work in slots 35 formed in the rear ends of the bars 12. Uprights 36 are arranged at the opposite sides of the structure and are secured at their upper ends to the side rails 3 and at their lower ends to the upstanding flanges 8 of the runners 9, and a shaft 37 is rotatably mounted at its ends in the upper portions of these uprights and has fixed upon its said ends sprocket gears 38 about which and similar gears 39 upon stub shafts 40 at the lower ends of the uprights 36, are trained sprocket chains 41. U-bolts 42 are secured to the rear portions of the bars 12 and have their bights clamping one of the links of the respective chains 41, and an operating hand lever 43 is fixed upon one end of the shaft 37, preferably the right hand end thereof, and provides means whereby the said shaft may be rotated. By reference to Figures 1 and 2 of the drawings, it will be observed that when the operating hand lever 43 is swung rearwardly to the position shown in Figure 1, the forward stretches of the chains 41 will be caused to travel upwardly, thus upwardly swinging the rear ends of the bars 12 and effecting a corresponding movement of the forward ends of the bars 30 so as to lower the wheels 18 and 33 to the position shown in the said Figure 1, so that the lower portions of the wheels will extend below the planes of the runners 9 and the device will thus be supported for travel. When the lever 43 is swung forwardly, however, the forward stretches of the chains 41 will be caused to travel downwardly, thus effecting downward swinging movement of the rear ends of the bars 12 and a corresponding movement of the forward ends of the bars 30, thus elevating the wheels or, in other words, permitting the device to lower from its former position shown in Figure 1, to the position shown in Figure 2, in which position the runners will engage the snow-covered ground surface and the device will be supported for travel over said surface. In order that the lever 43 may be held in either position of adjustment, detent plates 44 are secured upon the cross pieces 5 and have notched lower edges 45 to be engaged by the upper edge of the lever 43 when the lever is in either of its positions of adjustment, these detent plates preferably having their projecting outer ends beveled, as indicated by the numeral 46, and as clearly shown in Figure 6 of the drawings, so as to permit the lever to ride thereover and into engagement with their under edges. A hand knob 47 is preferably provided at the free end of the lever 43 so that it may be conveniently manipulated and it will be evident that by the simple swinging of this lever from one position of adjustment to the other, the device may be readily converted for use either as a coaster wagon or as a sled. It will likewise be evident that if the device is being used as a coaster wagon and a child using the same should find it necessary to come to a sudden stop, this may be accomplished by suddenly swinging the lever in a forward direction. This will result in the runners 9 being instantly brought into contact with the road or street surface and arrest the forward movement of the structure.

Having thus described the invention, what I claim is:

1. In a convertible coaster wagon and sled, a body structure, runners for supporting the same, rocking bars mounted at each side of the body structure, the bars on each side being operatively connected at their inner meeting ends, wheels supported at the forward ends of the front bars and the rear ends of the rear bars, operative connection between the bars on the two sides of the structure for effecting rocking movement thereof in unison, and means for adjusting said bars.

2. In a convertible coaster wagon and sled, a body structure, runners for supporting the same, rocking bars mounted at each side of the body structure, the bars on each side being operatively connected at their inner meeting ends, wheels supported at the forward ends of the front bars and the rear ends of the rear bars, operative connection between the bars on the two sides of the structure for effecting rocking movement thereof in unison, a swingingly adjustable hand lever, and means actuated through adjustment of the hand lever and operatively connected with one of the bars at each side of the structure for effecting adjustment of the said bars.

3. In a convertible coaster wagon and sled, a body structure, runners for supporting the same, rocking bars mounted at each side of the body structure, wheels supported at the forward ends of the front bars and the rear ends of the rear bars, operative connection between the bars at each side of the structure for effecting rocking movement thereof in unison, a shaft mounted upon the structure, sprocket gears fixed upon the shaft, other sprocket gears at each side of the structure, sprocket chains trained about the gears at each side of the structure, means for rotating the said shaft, and operative connection between the sprocket chains and one of the bars at each side of the structure.

4. In a convertible coaster wagon and sled, a body structure, runners for supporting the same, rocking bars mounted at each side of the body structure, wheels supported at the forward ends of the front bars and the rear ends of the rear bars, operative connection between the bars at each side of the structure for effecting rocking movement thereof in unison, a shaft mounted upon the structure, sprocket gears fixed upon the shaft, other sprocket gears at each side of the structure, sprocket chains trained about the gears at each side of the structure, a hand lever fixed upon the shaft for rotating the same, and operative connection between the sprocket chains and one of the bars at each side of the structure.

5. In a convertible coaster wagon and sled, a body structure, runners for supporting the same, rocking bars mounted at each side of the body structure, wheels supported at the forward ends of the front bars and the rear ends of the rear bars, operative connection between the bars at each side of the structure for effecting rocking movement thereof in unison, a shaft rotatably mounted upon the structure, sprocket gears upon the shaft, other sprocket gears upon the structure at opposite sides thereof, sprocket chains trained about the sprocket gears at each side of the structure, clamps embracing the chains and secured to the rear portions of the front bars at each side of the structure, a hand lever fixed upon one end of the shaft and constituting means for rotating the same, and detents arranged upon the structure in front and in rear of the said shaft for holding the said lever in its positions of adjustment.

6. In a convertible coaster wagon and sled, a body structure, runners for supporting the same, rocking bars mounted at each side of the body structure, pin and slot connections between the relatively adjacent ends of the bars at each side of the structure for connecting the bars for movement in unison, wheels supported by the corresponding bars, sprocket wheels at each side of the structure, sprocket chains trained about the wheels, means for imparting motion to the sprocket chains, and operative connection between each chain and one of the respective bars.

In testimony whereof I affix my signature.

ANDREW J. KELLY. [L. S.]